Patented Dec. 8, 1931

1,835,403

UNITED STATES PATENT OFFICE

GEORG KALISCHER AND OTTO BAYER, OF FRANKFORT-ON-THE-MAIN, GERMANY, ASSIGNORS TO GENERAL ANILINE WORKS, INC., OF NEW YORK, N. Y., A CORPORATION OF DELAWARE

NEW VEGETABLE EFFECT-THREADS AND PROCESS OF MAKING SAME

No Drawing. Application filed July 20, 1928, Serial No. 294,308, and in Germany September 5, 1927.

The production of vegetable effect-threads has been carried out hitherto by the action of arylcarboxylic or arylsulfonic acid chlorides on vegetable fibers previously treated with alkalies. As reacting agents particularly benzoylchloride (cf. German Patent No. 346,883) and para-toluenesulfochloride (cf. U. S. Patent No. 1,523,742) have been used, i. e. acid chlorides the arylresidue of which is of an indifferent nature.

Our present invention relates to new vegetable effect-threads in which the cellulose contains arylsulfonic acid residues substituted in the aryl nucleus by a primary, secondary or tertiary amino group including tertiary amine-residues such as the quinoline residue. The basic character of these substances brings about special valuable properties of the new effect-threads compared with all products hitherto prepared. In order to produce effect-threads of this kind one proceeds, as we have found, in such a manner, that an arylsulfonic acid chloride of the formula X—$SO_2$—Cl, wherein X means a basic arylresidue substituted in the aryl nucleus by a primary, secondary or tertiary amino group including tertiary amine-residues such as the quinoline residue is caused to act on vegetable fibers previously treated with alkalies. As basic aryl-solfonic acid chlorides suitable for our process may be named, for instance, sulfochlorides of tertiary amines of the benzene or naphthalene series, quinoline-8-sulfochloride, aminotoluene-sulfochlorides and sulfochlorides of other aromatic products of a similar basic character. These basic arylsulfonic acid chlorides are mostly new compounds not prepared hitherto. It is a surprising fact, that they are capable of esterifying cellulose in spite of the presence of basic residues.

Instead of starting from basic arylsulfochlorides of the above described kind one may use arylsulfochlorides substituted in such a way, that after the esterification of the fiber by a further process of transformation amino-substituted arylsulfonic acid esters are formed, for instance, one may start from nitroarylsulfochlorides and transform the nitroarylsulfonic acid esters formed by the action on the vegetable fiber into the corresponding aminoarylsulfonic acid esters by treating the material with a reducing agent the reduction process occuring surprisingly very smoothly without affecting the cellulosic material. Advantageously the amino-substituted as well as the nitroarylsulfochlorides may be caused to react on vegetable fibers in presence of a suitable organic solvent, and the course of reaction may be accelerated in some cases by the addition of a catalyst, such as phosphorus chlorides or basic substances, such as dimethylaniline. The new effect-threads are distinguished by excellent properties, particularly by a simultaneous resistance to heating and ironing and a remarkable fastness to alkali, a combination of fastness properties which was unknown hitherto, as the effect-threads, obtained according to U. S. Patent No. 1,523,742 by the action of, for instance, paratoluenesulfochloride are inferior to our new products, because they are non-resistant to heating and ironing, whereas the effect-threads obtainable according to German Patent No. 346,883 by the action of aromatic carboxylic acid chlorides are resistant to heating and ironing, but do not comply in all cases with the practical requirements as to fastness to alkali.

In order to further illustrate our invention the following examples are given, the parts being by weight and all temperatures in centigrade degrees; but we wish it to be understood that our invention is not limited to the examples given, nor to the exact conditions stated therein.

*Example 1.*—1 kg. of cotton yarn is transformed in the usual manner into the alkali compound, for instance, by means of an alcoholic caustic soda solution. After centrifugating and evaporating the alcohol. the yarn is treated at about 60° with 0.6 to 3 kgs. of dimethylaniline-para-sulfochloride, which are advantageously dissolved in an organic solvent, for instance, in the tenfold quantity of toluene or benzene. The treatment is continued until the yarn no longer shows an alkaline reaction. The yarn is worked up in the usual manner and a white end product thereupon is obtained, which proves to be indifferent, when dyeing with substantive colors. It is distinguished by a remarkable fastness to an alkaline treatment and an extreme resistance, even when strongly heated or ironed. By weaving it together with raw or bleached cotton yarn colored pattern fabrics with pure white effects are obtained.

The dimethylaniline-para-sulfochloride used as reacting agent is a new compound forming yellow crystals of 110° melting point, obtainable, for instance, with an excellent yield by acting with phosporus pentachloride on dimethylaniline-para-sulfonic acid or its salts in the presence of a suitable solvent, such as carbontetrachloride, and removing the solvent and the phosporus oxychloride by distillation in vacuo at temperatures below 80°.

When using instead of dimethylaniline-para-sulfochloride the equivalent amount of other basic sulfochlorides, such as dimethylaniline-meta-sulfochloride, diethyl-aniline-para-sulfochloride, quinoline-8-sulfochloride, ethylbenzylaniline-sulfochloride, dimethyl - α - naphthylaminesulfochloride (prepared by starting from the dimethyl-α-naphthylaminesulfonic acid of German Patent No. 90274, being difficultly soluble), 1-methyl-4-aminobenzene-3-sulfochloride etc., analogous products are obtained.

*Example 2.*—1 kg. of cotton yarn is alkalized in the usual manner and then treated at about 60° for about an hour with a solution of 1 kg. of meta-nitrobenzenesulfochloride in about 30 kgs. of trichloroethylene until an only feeble alkaline reaction of the fiber is obtained. The yarn is centrifuged, washed and warmed for about half an hour at about 60–70° with a solution of 0.7 kgs. of stannous chloride and 0.1 kgs. of acetic acid in about 50 liters of water. The yarn is worked up by washing again, rinsing with a dilute solution of sodium acetate and soaping, if necessary. The existence of the amino group formed by the action of the reducing agent can be proved, for instance, by diazotization of the esterified yarn and combining it with azo components. In contradistinction to the yarn not subjected to the reduction process the yarn, thus treated, is well suited for the use as effect-threads, being fast to alkali and resistant to steaming and ironing.

Instead of meta-nitrobenzenesulfochloride one may use the corresponding amount of 1.2-chloronitrobenzene-4-sulfochloride, 4-nitrotoluene-2-sulfochloride, nitroquinoline-8-sulfochloride and other similar nitroarylsulfochlorides. The reduction may be carried out in a neutral, acid or alkaline medium by means of for instance stannous, ferrous, titanic salts, alkali polysulfides, formaldehyde, hydrazine etc.

In the following claims the term "amino-substituted" aryl-sulfonic acids is intended to include aryl-sulfonic acids substituted in the aryl nucleus by a primary, secondary or tertiary amino group including tertiary amino-residues such as the quinoline residue.

We claim:

1. As new products vegetable effect-threads in which the cellulose contains amino-substituted arylsulfonic acid residues.

2. A process which comprises acting on vegetable fibers previously treated with alkalies with an amino-substituted arylsulfonic acid chloride of the formula $X-SO_2-Cl$, wherein X means an amino-substituted aryl-residue.

3. A process which comprises acting on vegetable fibers previously treated with alkalies with a dialkylaniline-para-sulfochloride.

4. As new products vegetable effect-threads containing a dialkylaniline-para-sulfonic acid ester of cellulose.

In testimony whereof, we affix our signatures.

GEORG KALISCHER.
OTTO BAYER.